United States Patent
Rowe et al.

(10) Patent No.: US 6,777,853 B2
(45) Date of Patent: Aug. 17, 2004

(54) DYNAMOELECTRIC MACHINE WITH ADJUSTABLE BIAS END WINDING SUPPORT ASSEMBLY

(75) Inventors: Charles M. Rowe, Orlando, FL (US); Alex Christodoulou, Oviedo, FL (US); Lorenzo Ramirez, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 129 days.

(21) Appl. No.: 10/218,714

(22) Filed: Aug. 14, 2002

(65) Prior Publication Data

US 2004/0032182 A1 Feb. 19, 2004

(51) Int. Cl.[7] ............................................... H02K 3/46
(52) U.S. Cl. ....................................... 310/260; 310/194
(58) Field of Search ................................. 310/260, 270, 310/194

(56) References Cited

U.S. PATENT DOCUMENTS

| | | | | |
|---|---|---|---|---|
| 3,558,950 A | * | 1/1971 | Raybould | 310/270 |
| 4,037,126 A | * | 7/1977 | Brennan et al. | 310/260 |
| 4,238,339 A | * | 12/1980 | Khutoretsky et al. | 310/260 |
| 4,563,607 A | * | 1/1986 | Cooper et al. | 310/260 |
| 5,140,740 A | | 8/1992 | Weigelt | 29/596 |
| 5,606,212 A | * | 2/1997 | Sasa et al. | 310/270 |
| 5,798,595 A | * | 8/1998 | Nilsson et al. | 310/260 |
| 5,939,814 A | * | 8/1999 | Rowe et al. | 310/260 |
| 6,054,792 A | * | 4/2000 | Rowe et al. | 310/260 |
| 6,218,759 B1 | * | 4/2001 | Blakelock et al. | 310/254 |
| 6,225,726 B1 | | 5/2001 | Rowe et al. | 310/260 |

* cited by examiner

Primary Examiner—Karl Tamai
Assistant Examiner—Yahveh Comas

(57) ABSTRACT

A dynamoelectric machine 20 includes a rotor 24 and a stator 26 surrounding the rotor. The stator 26 includes a plurality of windings arranged in a main portion 28 adjacent the rotor 24 and terminating in a plurality of inner and outer end windings 32, 34 extending outwardly from the main portion. An end winding support assembly 22 includes at least one support ring 36 for the plurality of end windings 32 and a respective adjustable bias member 38 between the at least one support ring and each adjacent end winding to provide an adjustable separation bias between the at least one support ring and each adjacent end winding.

19 Claims, 3 Drawing Sheets

DYNAMOELECTRIC MACHINE WITH ADJUSTABLE BIAS END WINDING SUPPORT ASSEMBLY

FIELD OF THE INVENTION

The present invention relates to dynamoelectric machines, and, more particularly, to electrical power generators including a rotor and a stator in which the stator includes a plurality of end windings.

BACKGROUND OF THE INVENTION

A dynamoelectric machine, such as turbine-driven electrical power generator, includes a rotor and a stator surrounding the rotor. The stator includes a plurality of windings arranged in a main portion adjacent the rotor and terminating in a plurality of inner and outer end windings extending outwardly from the main portion. These inner and outer end windings are also commonly referred to as top and bottom end windings, respectively. Electrical power is generated as the rotor rotates within the stator and electrical current flows through the windings.

During operation of the electrical power generator, the end windings extending outwardly from the main portion are typically subjected to severe vibrations and stresses. Additionally, the electromagnetic forces associated with the generation of electrical power, arising especially if an abnormal short-circuit or fault occurs, may cause structural deformation of the end windings.

Therefore, at least one support ring is typically positioned adjacent the end windings to secure the end windings and prevent their deformation, which could result in an end winding contacting the rotor. The use of such support rings is disclosed, for example, in U.S. Pat. No. 6,225,726 to Rowe et al. and U.S. Pat. No. 6,054,792 to Rowe et al., each of which is assigned to the assignee of the present invention.

U.S. Pat. No. 5,140,740 to Weigelt discloses a pad between the support ring and an end winding. Such pads, for example, can be made of Dacron. Over time, however, such padding is prone to deformation and insulation creep, resulting in a loosening of the fit between the support ring and end windings. Additionally, after prolonged operation of the electrical generator, there may be shifts in the alignment of the inner end winding and support ring, causing the pad to fit less securely between the inner winding and support ring, and thereby further loosening the fit between the support ring and end winding.

As a result, the support ring less effectively secures the inner end winding. Accordingly, there is a greater chance that the support ring will not prevent vibration or deformation of the inner winding as initially intended. Moreover, loosely held pads can slide against the insulation that typically surrounds the surface of the end windings, thereby wearing away the insulation as the end windings vibrate during operation of the electrical power generator.

SUMMARY OF THE INVENTION

With the foregoing background in mind, it is therefore an object of the present invention to provide more effective support for the inner end windings of a dynamoelectric machine.

This and other objects, features, and advantages in accordance with the present invention are provided by a dynamoelectric machine comprising an end winding support assembly for providing an adjustable separation bias between at least one support ring and adjacent end windings. The dynamoelectric machine includes a rotor and a stator surrounding the rotor, the stator comprising a plurality of windings arranged in a main portion adjacent the rotor and terminating in a plurality of inner and outer windings extending outwardly from the main portion. The end winding support assembly comprises at least one support ring and a respective adjustable bias member between the support ring and each adjacent end winding. Accordingly, the support ring supports the plurality of end windings, and each adjustable bias member provides an adjustable separation bias between the support ring and adjacent end winding.

The support ring may have a plurality of passageways therein, and each adjustable bias member further may comprise a shaft received in a respective passageway and extendable outwardly therefrom. Each shaft may have an enlarged diameter medial portion, and each adjustable bias member may further comprise at least one washer, the washer being on the shaft and adjacent the enlarged diameter medial portion thereof. The at least one washer may comprise a compressible washer. More particularly, the compressible washer may comprise a spring washer.

Each passageway further may comprise a threaded end portion opposite a respective end winding, and each adjustable bias member further may comprise a threaded fastener received in the threaded end portion to adjustably engage the shaft. Additionally, each passageway may further comprise a series of non-threaded portions adjacent the threaded portion and having progressively increasing diameters.

A pair of adjacent non-threaded portions may define a shoulder for restricting movement of the enlarged diameter medial portion of the shaft. An outermost non-threaded portion may define a recess for receiving therein at least one washer on the shaft. Each adjustable bias member may further comprise a pusher plate connected to an adjacent portion of the end winding.

An additional aspect of the invention pertains to a method of supporting a plurality of inner end windings of a stator in a dynamoelectric machine. The method may include providing at least one support ring for the plurality of inner end windings and positioning a respective adjustable bias member between the at least one support ring and each adjacent inner end winding to thereby provide an adjustable separation bias therebetween. Each adjustable bias member may comprise a compressible member. The method may also comprise forming a plurality of passageways in the at least one support ring, and providing a shaft in each respective passageway of the at least one support ring so that the shaft is extendable outwardly therefrom.

DETAILED DESCRIPTION OF THE PREFERRED EMBODIMENTS

The present invention will now be described more fully hereinafter with reference to the accompanying drawings that illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
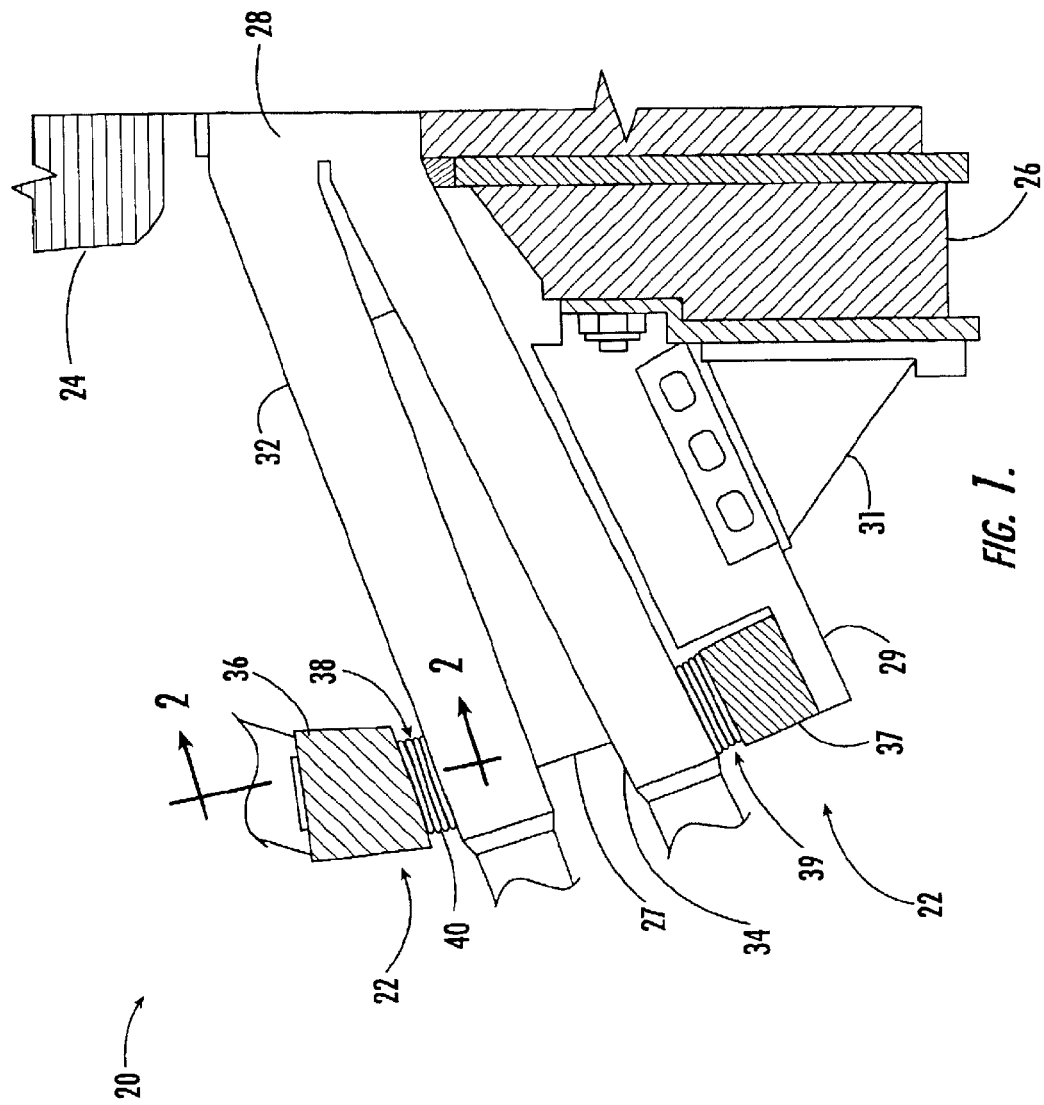
FIG. 1 is a cross-sectional view of a portion of a dynamoelectric machine including an end winding support assembly according to the present invention.
Figure 2:
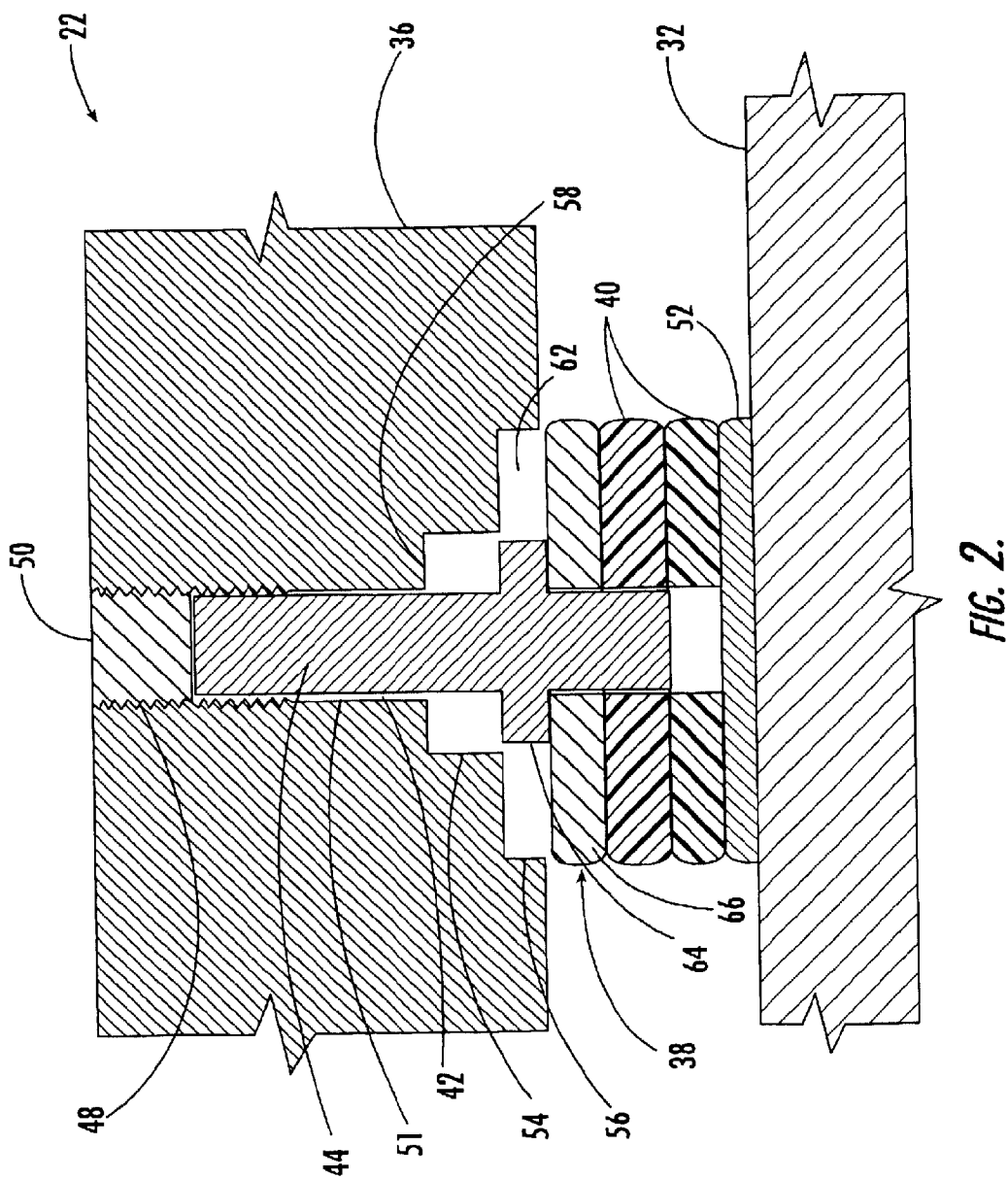
FIG. 2 is a cross-sectional view of an end winding support assembly and a portion of an adjacent ending winding taken along line 2—2 of FIG. 1.
Figure 3:
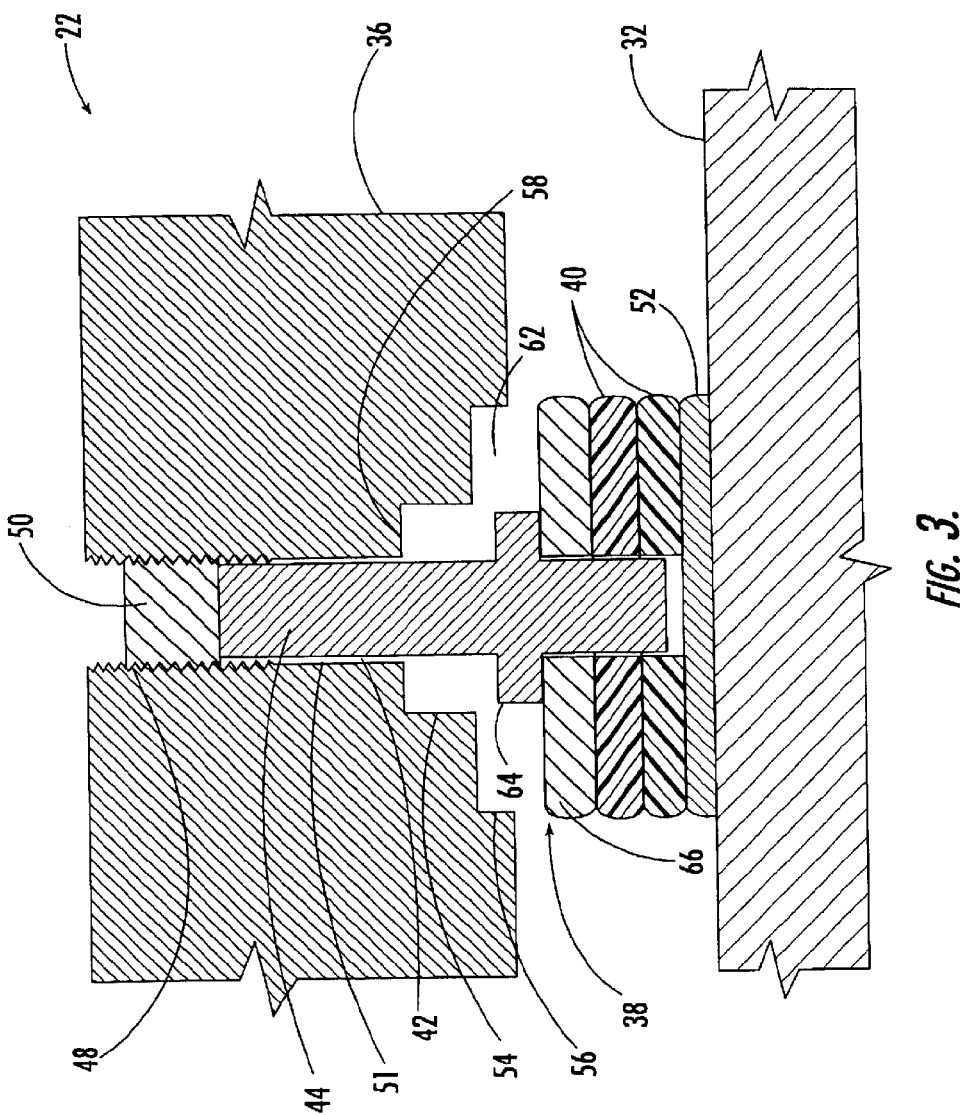
FIG. 3 is a cross-sectional view as in FIG. 2 and showing the adjustable bias member in a greater bias position.

Referring to FIGS. 1–3, a dynamoelectric machine 20 including an end winding support assembly 22 is described. The dynamoelectric machine includes a rotor 24 and a stator 26 surrounding rotor. The stator comprises a plurality of windings arranged in a main portion 28 adjacent the rotor and terminating in a plurality of inner and outer end windings 32, 34 extending outwardly from the main portion 28.

A padded insert 27 is illustratively located between a respective pair of inner end windings 32 and a respective pair of outer end windings 34. A brace 29 underlies the outer end windings 34. The brace 29 connects to a bracket 31 that, in turn, connects to the stator 26.

The end winding support assembly 22 illustratively comprises an inner support ring 36 for the plurality of inner end windings 32 and a respective adjustable bias member 38 between the support ring and each adjacent inner end winding for providing an adjustable separation bias therebetween. The end winding support assembly 22 also illustratively comprises an outer support ring 37 and respective adjustable bias member 39 for the plurality of outer end windings 34 to thereby provide an adjustable separation bias therebetween as well. As will be readily apparent from the ensuing discussion, the support assembly alternatively may comprise one support ring and one respective adjustable bias member, or, it may comprise more than two support rings and two respective adjustable bias members.

For the convenience of the reader, the support assembly 22 is subsequently described in terms of the inner end windings 32, support ring 36 and a respective adjustable bias member 38. It is to be understood, however, that the discussion pertains as well to similar elements to be found associated with the support ring 37 and respective adjustable bias member 39 for the outer end windings 34.

The support ring 36 includes a plurality of passageways 42 therein, and each adjustable bias member 38 further comprises a shaft 44 received in a respective passageway of the support ring 36. Each shaft 44 is extendable outwardly therefrom.

Each shaft 44 illustratively has an enlarged diameter medial portion 64, and each adjustable bias member 38 further comprises at least one washer 40, 66 on the shaft adjacent the enlarged diameter medial portion. The at least one washer illustratively comprises a pair of compressible washers 40. The compressible washers 40 can comprise spring washers, for example, as will be readily understood by those skilled in the art. More particularly, such a spring washer may have a cup shape and be made of a material such as fiberglass.

Opposite a respective inner end winding 32, each passageway 42 further comprises a threaded portion 48. Each adjustable bias member 38 further comprises a threaded fastener 50 received in the threaded portion to adjustably engage the top end of the shaft 44. The outward extent of the shaft 44 from the passageway 42, accordingly, can be controlled by adjustment of the threaded fastener 50 in the threaded portion 48 of the passageway. Accordingly, as illustrated, the shaft 44 loads the adjustable bias member 38 (e.g., spring washer), and the load can be changed as desired. Thus, if any of the plurality of inner end windings 32 shift in alignment relative to the support ring 36, the tightness of the fit of the support ring relative to the inner windings can nonetheless be maintained at a desired level by adjusting the load with the adjustable bias member 38.

This provides an inner end winding support capability not heretofore available in conventional dynamoelectric machines in which pads are typically used between a support ring and inner end windings. Pads can wear down over time and there may be realignment of the support ring and inner end windings during operation. Without a re-tightening feature as provided by the adjustable bias member 38 of the present invention, a support ring may not consistently provide the desired support to the inner end windings. This can result in significant damage to the electrical power generator.

Moreover, without the re-tightening capability provided by the adjustable bias member 38 of the present invention, these problems cannot be easily corrected. Correcting the problem when conventional pads are used in a dynamoelectric machine can require a complete replacement of pads that have worn into insulation that typically surrounds the end windings or that otherwise no longer have the necessary thickness to fit securely between the support ring and inner end windings.

Illustratively, each passageway 42 further comprises a series of non-threaded portions 51, 54, 56 adjacent the threaded portion, the non-threaded portions each having progressively increasing diameters. As illustrated, a pair of adjacent non-threaded portions 51, 54 define a shoulder 58 that restricts movement of the enlarged diameter medial portion 64 of the shaft 44 therepast. Additionally as illustrated, an outermost non-threaded portion 56 defines a recess 62 that can receive at least one washer 40, 66 therein. The at least one washer, for example, can be a flat washer 66 adjacent at least one compressible washer (e.g., spring washer) 40.

As also illustrated, each adjustable bias member 38 further comprises a pusher plate 52. The pusher plate 52 is connected to an inner end winding 32. A pair of compressible washers 40 (e.g., cup-shaped fiberglass spring washers) is illustratively positioned between the pusher plate 52 and the flat washer 66.

A method aspect of the invention is for supporting the inner end windings 32 in a dynamoelectric machine 20 comprising a rotor 24 and a stator 26 surrounding the rotor. The stator 26 includes a plurality of windings 28 arranged in a main portion 30 adjacent the rotor and terminating in a plurality of inner and outer end windings 32, 34 extending outwardly from the main portion. The method preferably comprises providing a support ring 36 for the plurality of inner end windings 32, and positioning a respective adjustable bias member 38 between the support ring and each adjacent inner end winding to thereby provide an adjustable separation bias therebetween.

The method further comprises forming a plurality of passageways 42 in the support ring 36, and providing a shaft 44 in each respective passageway of the support ring, the shaft extending outwardly therefrom. Forming a passageway 42, moreover, comprises forming a threaded portion 48 opposite a respective inner end winding 32. The method further comprises providing a threaded fastener 50 in the threaded portion for engaging the shaft 44 therein.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

What is claimed is:

1. A dynamoelectric machine comprising:
   a rotor;
   a stator surrounding said rotor, said stator comprising a plurality of windings arranged in a main portion adjacent said rotor and terminating in a plurality of end windings extending outwardly from the main portion; and
   an end winding support assembly comprising
      at least one support ring for the plurality of end windings, and
      a respective adjustable bias member between said at least one support ring and each adjacent end winding for providing an adjustable separation bias therebetween;
   wherein said at least one support ring has a plurality of passageways therein;
   wherein each adjustable bias member further comprises a shaft received in a respective passageway of said at least one support ring and extendable outwardly therefrom;
   wherein each shaft has an enlarged diameter medial portion; and wherein each adjustable bias member further comprises at least one washer on said shaft and adjacent the enlarged diameter medial portion thereof.

2. A dynamoelectric machine according to claim 1 wherein said at least one washer comprises at least one compressible washer.

3. A dynamoelectric machine according to claim 2 wherein said at least one compressible washer comprises at least one spring washer.

4. A dynamoelectric machine according to claim 1 wherein each passageway further comprises a threaded end portion opposite a respective end winding; and wherein each adjustable bias member further comprises a threaded fastener received in the threaded end portion and adjustably engaging the shaft.

5. A dynamoelectric machine according to claim 4 wherein each passageway further comprises a series of non-threaded portions adjacent the threaded portion and having progressively increasing diameters.

6. A dynamoelectric machine according to claim 5 wherein a pair of adjacent non-threaded portions define a shoulder for restricting movement of the enlarged diameter medial portion of the shaft therepast.

7. A dynamoelectric machine according to claim 5 wherein an outermost non-threaded portion defines a recess for receiving said at least one washer therein.

8. A dynamoelectric machine according to claim 1 wherein each adjustable bias member further comprises a pusher plate connected to an adjacent portion of the end winding.

9. An end winding support assembly for supporting end windings of a stator and comprising:
   a support ring; and
   at least one adjustable bias member for providing an adjustable separation bias between said support ring and an adjacent end winding;
   wherein said support ring has at least one passageway therein; and wherein said at least one adjustable bias member further comprises a shaft received in said at least one passageway and extendable outwardly therefrom;
   wherein said shaft has an enlarged diameter medial portion; and wherein said at least one adjustable bias member further comprises at least one washer on said shaft and adjacent the enlarged diameter medial portion thereof.

10. An end winding support assembly according to claim 9 wherein said at least one washer comprises at least one compressible washer.

11. An end winding support assembly according to claim 10 wherein said at least one compressible washer comprises at least one spring washer.

12. An end winding support assembly according to claim 11 wherein said at least one passageway further comprises a threaded end portion oppsite said inner end winding; and wherein said at least one adjustable bias member further comprises a threaded fastener received in the threaded end portion and adjustably engaging said shaft.

13. An end winding support assembly according to claim 12 wherein said at least one passageway further comprises a series of non-threaded portions adjacent the threaded portion and having progressively increasing diameters.

14. An end winding support assembly according to claim 13 wherein a pair of adjacent non-threaded portions defines a shoulder for restricting movement of the enlarged diameter medial portion of the shall therepast.

15. An end winding support assembly according to claim 13 wherein an outermost non-threaded portion defines a recess for receiving said at least one washer therein.

16. In a dynamoelectric machine comprising a rotor and a stator surrounding the rotor, the stator comprising a plurality of windings arranged in a main portion adjacent the rotor and terminating in plurality of end windings extending outwardly from the main portion, a method of supporting the end windings comprising:
   providing at least one support ring for the plurality of end windings; and
   positioning a respective adjustable bias member between the at least one support ring and each adjacent end winding to thereby provide an adjustable separation bias therebetween;
   wherein said support ring has a passageway therein; and wherein said adjustable bias member further comprises a shaft received in said passageway and extendable outwardly therefrom;
   wherein said shaft has an enlarged diameter medial portion; and wherein said adjustable bias member further comprises at least one washer on said shall and adjacent the enlarged diameter medial portion thereof.

17. A method according to claim 16 wherein each adjustable bias member comprises a compressible washer.

18. A method according to claim 16 further comprising forming a plurality of passageways in the at least one support ring, and providing a shaft in each respective passageway of the support ring and extending outwardly therefrom.

19. A method according to claim 16 where in forming each passageway comprises forming a threaded portion opposite a respective end winding; and further comprising providing a threaded fastener in the threaded portion for engaging the shaft.

* * * * *